(12) United States Patent
Okawa (10) Patent No.: US 9,183,446 B2
(45) Date of Patent: Nov. 10, 2015

(54) IMAGE PROCESSING APPARATUS AND IMAGE PROCESSING METHOD

(75) Inventor: Koji Okawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/485,315

(22) Filed: May 31, 2012

(65) Prior Publication Data

US 2012/0314956 A1    Dec. 13, 2012

(30) Foreign Application Priority Data

Jun. 9, 2011   (JP) ................. 2011-129544

(51) Int. Cl.
*G06K 9/46* (2006.01)
*G06K 9/00* (2006.01)

(52) U.S. Cl.
CPC ........ *G06K 9/00771* (2013.01); *G06K 9/00261* (2013.01); *G06K 9/46* (2013.01)

(58) Field of Classification Search
CPC ..... H04N 19/11; H04N 19/176; H04N 19/51; H04N 19/56; H04N 19/137; H04N 19/124; H04N 19/577; H04N 5/144; H04N 5/145; H04N 19/463; H04N 19/527; H04N 19/57; H04N 21/6587; H04N 19/29; H04N 19/91; H04N 19/44; H04N 19/36; H04N 19/159; H04N 19/23; H04N 19/547; H04N 19/517; H04N 19/48; H04N 19/55; H04N 19/94; G06T 9/001
USPC .................. 375/240; 382/248, 246, 233, 232; 348/43, 22, 208, 231, 441, 452
See application file for complete search history.

(56) References Cited

U.S. PATENT DOCUMENTS

| 4,951,140 | A  | * | 8/1990 | Ueno et al. ................ 348/413.1 |
| 5,819,212 | A  | * | 10/1998 | Matsumoto et al. .......... 704/219 |
| 5,907,361 | A  | * | 5/1999 | Okada ...................... 375/240.08 |
| 6,023,301 | A  | * | 2/2000 | Katata et al. .................. 348/586 |
| 6,064,436 | A  | * | 5/2000 | Okada ...................... 375/240.16 |
| 6,895,051 | B2 | * | 5/2005 | Nieweglowski et al. 375/240.03 |
| 6,931,658 | B1 | * | 8/2005 | Kawamura et al. ............ 725/94 |
| 7,110,450 | B1 | * | 9/2006 | Kimoto ........................ 375/240 |
| 7,184,604 | B2 | * | 2/2007 | Mizuno et al. ................ 382/248 |
| 8,130,828 | B2 | * | 3/2012 | Hsu et al. ................. 375/240.03 |
| 8,155,190 | B2 | * | 4/2012 | Imamura et al. ......... 375/240.13 |

(Continued)

FOREIGN PATENT DOCUMENTS

| JP | 2009-005238 | 1/2009 |
| JP | 2009-005239 | 1/2009 |

(Continued)

OTHER PUBLICATIONS

Office Action dated May 15, 2015—JP Application No. 2011-131636.

(Continued)

*Primary Examiner* — Vu Le
*Assistant Examiner* — Aklilu Woldemariam
(74) *Attorney, Agent, or Firm* — Fitzpatrick, Cella, Harper & Scinto (57) ABSTRACT

Out of regions extracted from a frame image, regions assigned the same identification information as that of a region unselected in a past frame immediately before the frame are defined as nonselection regions, and nonselection regions in number equal to or smaller than a predetermined number are selected out of the nonselection regions.

16 Claims, 8 Drawing Sheets

(56) References Cited

U.S. PATENT DOCUMENTS

| | | |
|---|---|---|
| 8,204,136 B2 | 6/2012 | Omori ............... 375/240.27 |
| 8,559,735 B2 * | 10/2013 | Sakuyama ............... 382/233 |
| 2003/0118100 A1 | 6/2003 | Honda ............... 375/240.08 |
| 2004/0212729 A1 * | 10/2004 | Yamaguchi et al. ....... 348/387.1 |
| 2006/0182350 A1 | 8/2006 | Kondo et al. ............... 382/232 |
| 2006/0239575 A1 * | 10/2006 | Abe et al. ............... 382/246 |
| 2007/0019083 A1 * | 1/2007 | Nakashima ............... 348/239 |
| 2008/0123745 A1 | 5/2008 | Omori ............... 375/240.16 |
| 2008/0123972 A1 * | 5/2008 | Sekiguchi et al. ............... 382/232 |
| 2009/0092326 A1 * | 4/2009 | Fukuhara et al. ............... 382/233 |
| 2009/0231453 A1 | 9/2009 | Huang ............... 348/220.1 |
| 2009/0285498 A1 * | 11/2009 | Sakuyama ............... 382/233 |
| 2010/0109867 A1 | 5/2010 | Williams ............... 340/540 |
| 2010/0189175 A1 | 7/2010 | Fujii et al. ............... 375/240.03 |
| 2010/0305857 A1 | 12/2010 | Byrne ............... 701/301 |
| 2011/0007823 A1 | 1/2011 | Matsuo et al. ............... 375/240.26 |
| 2011/0255799 A1 | 10/2011 | Omori ............... 382/248 |
| 2012/0275717 A1 | 11/2012 | Ueda ............... 382/236 |
| 2013/0022125 A1 * | 1/2013 | Sato ............... 375/240.16 |

FOREIGN PATENT DOCUMENTS

| | | | |
|---|---|---|---|
| JP | 2009-048620 A | 3/2009 | ............... G06T 7/20 |
| JP | 2010-0193441 | 9/2010 | |

OTHER PUBLICATIONS

U.S. Appl. No. 13/478,767, filed May 23, 2012.

"Information Technology—Coding of Audio-Visual Objects—Part 2: Visual", ISO/IEC International Standard 14496-2 (MPEG-4 Visual), Second Edition, Dec. 1, 2001.

"Information Technology—Coding of Audio-Visual Objects—Part 10: Advanced Video Encoding", ISO/IEC International Standard 14496-10 (MPEG-4 Advanced Video Coding), First Edition, Dec. 1, 2003.

"Information Technology—Generic Coding of Moving Pictures and Associated Audio Information: Video", ISO/IEC International Standard 13818-2 (MPEG-2), 1995.

"Series H: Audiovisual and Multimedia Systems Infrastructure of Audiovisual Services—Coding of Moving Video", Recommendation ITU-T H.264, Advanced Video Coding for Generic Audiovisual Series (MPEG-4 AVC/H.264), Jun. 2011.

U.S. Appl. No. 13/456,889, filed Apr. 26, 2012.

Notice of Allowance—U.S. Appl. No. 13/478,767 dated Jul. 29, 2015.

* cited by examiner

IMAGE PROCESSING APPARATUS AND IMAGE PROCESSING METHOD

BACKGROUND OF THE INVENTION

1. Field of the Invention

The present invention relates to a technique of encoding a specific region of an image to image quality higher than in other regions.

2. Description of the Related Art

An image signal encoding technique is used to transfer or store/reproduce a moving image. As such a moving image encoding technique, an international standard encoding method such as ISO/IEC International Standard 14496-2 (MPEG-4 Visual) is known. As another international standard encoding method, H.264 and the like by ITU-T and ISO/IEC are also known. In this specification, ITU-T Rec. H.264 Advanced Video Coding 1 ISO/IEC International Standard 14496-10 (MPEG-4 AVC) will simply be referred to as H.264. These techniques are used in the fields of video camera and recorder as well. In particular, there is recently a vigorous effort going on to apply the techniques to surveillance video cameras (to be referred to as surveillance cameras hereinafter).

In application to a surveillance camera, image data is encoded at a relatively low bit rate to suppress the size of encoded data in many cases because of necessity of long-term recording. In the low bit rate encoding, however, a large amount of information is lost, and the image quality degrades. For this reason, the technique cannot function well to achieve the original object of, for example, specifying a human face. Instead of uniformly encoding a whole frame, there is generally used a technique of detecting a region such as a human face, which is supposed to be important for the application purpose, as a specific region so as to divide the frame into a specific region and other regions (nonspecific regions) and changing the code amount assignment for each region. More specifically, encoding is performed by assigning a large code amount to the specific region not to lower the image quality while suppressing the code amount only in the nonspecific regions.

In this technique, however, when a plurality of specific regions exist in a frame, and a large code amount is assigned to every specific region, the actual bit rate exceeds the target bit rate. On the other hand, if the code amount is uniformly assigned to all specific regions within the range of the target bit rate, image quality suitable for the application purpose of, for example, specifying a human face cannot be obtained in the specific regions. To solve these problems, techniques of controlling code amount assignment to each specific region have been proposed.

An example of such related arts is patent literature 1 (Japanese Patent Laid-Open No. 2010-193441). In patent literature 1, a specific region having a smaller area in a frame is assigned a larger code amount than that for a specific region having a larger area in the frame. This makes it possible to reliably create compressed data capable of clearly showing a face captured in a small size and also maintain image quality enough to recognize a face captured in a large size even with little decrease in the compression rate.

In the above-described related art, however, even if the area ratio of the specific regions to the frame is low, it may be impossible to obtain desired image quality when a lot of specific regions exist.

SUMMARY OF THE INVENTION

The present invention has been made in consideration of the above-described problems, and provides an encoding technique capable of obtaining, in a specific region, image quality suitable for an application purpose of, for example, specifying a human without increasing the bit rate even if a lot of specific regions exist.

According to the first aspect of the present invention, an image processing apparatus for encoding each frame image of a moving image, comprises an extraction unit that extracts, for each frame, a region of each object captured in the frame image and assigns identification information unique to the object captured in the region to the region; a selection unit that selects, as selection regions for each frame, a predetermined number of regions out of the regions extracted from the frame image by the extraction unit; and an encoding unit that encodes each frame image using an encoding parameter to encode the selection regions in the image to image quality higher than in regions other than the selection regions, wherein for each frame, the selection unit defines, out of the regions extracted from the frame image by the extraction unit, regions assigned the same identification information as that of a region unselected by the selection unit in a past frame immediately before the frame as nonselection regions, and selects, out of the nonselection regions, nonselection regions in number not more than the predetermined number as some or all of the predetermined number of regions.

According to the second aspect of the present invention, an image processing method to be performed by an image processing apparatus for encoding each frame image of a moving image, comprises an extraction step of extracting, for each frame, a region of each object captured in the frame image and assigning identification information unique to the object captured in the region to the region; a selection step of selecting, as selection regions for each frame, a predetermined number of regions out of the regions extracted from the frame image in the extraction step; and an encoding step of encoding each frame image using an encoding parameter to encode the selection regions in the image to image quality higher than in regions other than the selection regions, wherein in the selection step, for each frame, out of the regions extracted from the frame image in the extraction step, regions assigned the same identification information as that of a region unselected in the selection step in a past frame immediately before the frame are defined as nonselection regions, and out of the nonselection regions, nonselection regions in number not more than the predetermined number are selected as some or all of the predetermined number of regions.

Further features of the present invention will become apparent from the following description of exemplary embodiments with reference to the attached drawings.

DESCRIPTION OF THE EMBODIMENTS

The embodiments of the present invention will now be described with reference to the accompanying drawings.

Note that each embodiment to be described below is an example of practicing the present invention and one of detailed examples of the arrangements in the appended claims.

First Embodiment

In this embodiment, an image processing apparatus for encoding each frame image of a moving image will be described. First, an example of the functional arrangement of the image processing apparatus according to the embodiment will be described with reference to the block diagram of FIG. 1.

Figure 1:
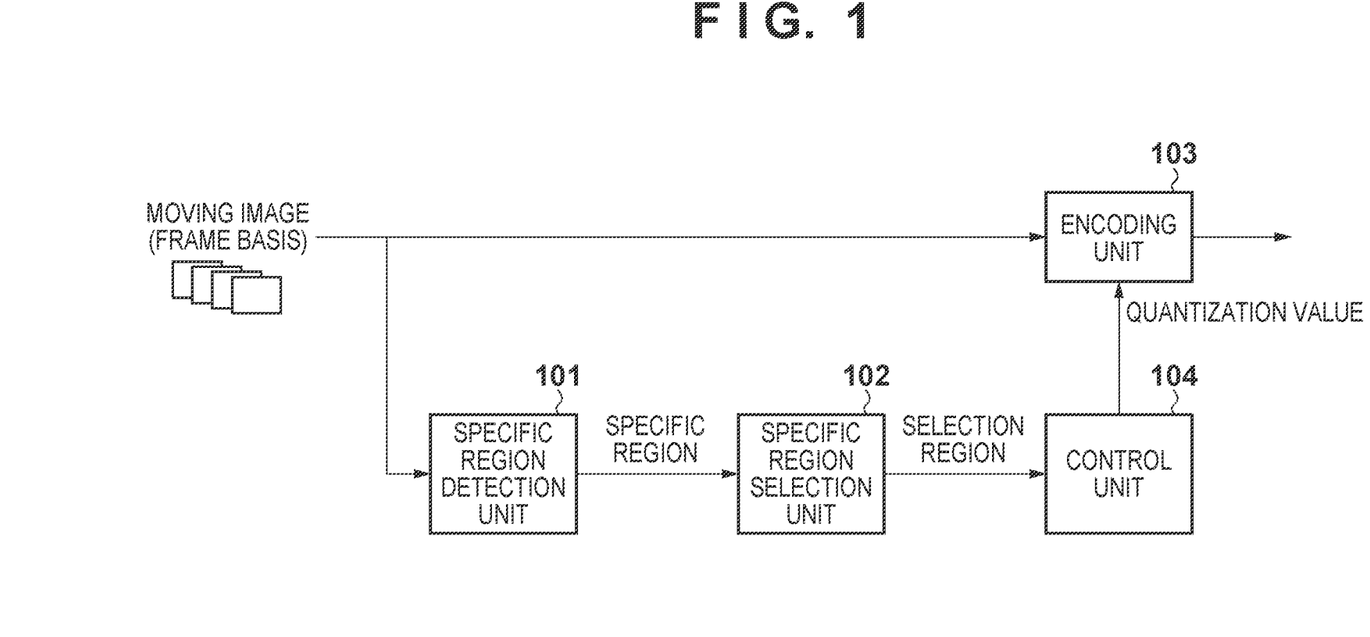
FIG. 1 is a block diagram showing an example of the functional arrangement of an image processing apparatus.

Each frame image of a moving image is input to a specific region detection unit 101 and an encoding unit 103.

The specific region detection unit 101 extracts (detects), in each frame, the region (specific region) of each object included in the frame image, and assigns, to each region, identification information unique to the object included in the region. Note that once a region is detected and assigned identification information, the specific region detection unit 101 continuously tracks it and assigns the same identification information throughout the frames.

The "object" is not particularly limited and need only be regarded as important in each use case. The object can be, for example, a human face, a human body, a moving object, an invader, or an object left behind. In addition, the object region can be a region designated by the user using an operation unit or the like.

The object region can be rectangular, circular, or elliptical. In this embodiment, the identification information is an ID. However, the identification information is not limited to this.

The specific region detection unit 101 generates, for each frame, region information including feature information of each object region detected in the frame image and the total number of object regions. The feature information includes a set of {region ID, region area, region position in the image (for example, the positions of the upper left and lower right corners)}. The specific region detection unit 101 sends the generated region information to a specific region selection unit 102. Note that the feature information can be any information capable of uniquely specifying each object region in the image. The feature information is not limited to the above-described information. For example, information representing the object region detection accuracy or the orientation of a human face may be output, or only the coordinates of a region may be output.

The specific region selection unit 102 selects, in each frame, a predetermined number of regions out of the regions extracted from the frame image by the specific region detection unit 101 as regions (selection regions) to be encoded to higher image quality. The selection region selecting method of the specific region selection unit 102 will be described later with reference to FIGS. 2A and 2B.

The encoding unit 103 encodes each input frame image using an encoding parameter set by a control unit 104. The control unit 104 sets an encoding parameter to encode a selection region in the frame image to be encoded by the encoding unit 103 to image quality higher than in regions other than the selection region, and supplies the set encoding parameter to the encoding unit 103. For example, when a quantization step is employed as the encoding parameter, the control unit 104 sets the quantization step for the selection region to be smaller than the quantization step for the regions other than the selection region. The encoding parameter is not limited to the quantization step, and for example, a value in a quantization table may be employed, as a matter of course.

The control unit 104 also controls the operations of various units included in the image processing apparatus.

A selection region selecting process to be performed by the specific region selection unit 102 will be described next with reference to FIGS. 2A and 2B each of that illustrates the flowchart of the process. Note that the specific region selection unit 102 performs the process according to the flowcharts of FIGS. 2A and 2B for each frame. A process of selecting a selection region for a frame image of interest will be exemplified in the following explanation.

In step S201, the specific region selection unit 102 receives region information sent from the specific region detection unit 101. In step S202, an ID included in each feature information of the region information is stored in an array ID[ ]. In addition, "the total number of object regions" included in the region information is set to a variable M. That is, the array ID[ ] includes ID[0] to ID[M−1]. The IDs of M regions are stored in ID[0] to ID[M−1], respectively.

In step S203, the specific region selection unit 102 refers to an array IDprev[ ] that stores the IDs of regions detected by the specific region detection unit 101 from a past frame immediately before the frame of interest. An ID that is stored in the array ID[ ] but not in the array IDprev[ ] is specified. This is a process of specifying the ID of an object that has not been detected in the past frame immediately before the frame of interest but newly detected in the frame of interest. For example, assume that ID=n is stored in ID[ ] but not in IDprev[ ]. In this case, a variable f[n] representing the number of continuous frames in which the region of ID=n has been selected (continuous selection count) is initialized to 0. Simultaneously, a variable t[n] representing the number of continuous frames in which the region of ID=n has not been selected (continuous nonselection count) is initialized to a sufficiently large predetermined value. When a sufficiently large predetermined value is set to the variable t[n] representing the continuous nonselection count, the region is preferentially selected as a selection region in the processes of steps S212 to S215 to be described later.

In step S204, variables sel_num and max_idx are initialized to 0, and each element of an array sel_list[ ] is initialized to a predetermined value such as NULL.

Steps S205 to S209 are performed for i=0 to (M−1). First, in step S206, it is determined whether 0<f[ID[i]]<Tcon is satisfied. That is, it is determined whether the continuous selection count of "region of ID=ID[i]" detected from the frame image of interest is larger than 0 and smaller than a predetermined count Tcon. Upon determining that the condition is satisfied, the process advances to step S208. Upon determining that the condition is not satisfied, the process advances to step S207.

In step S208, ID[i] is stored in the element (sel_list[sel_num]) represented by sel_num in the array sel_list[ ] to register the ID of the selection region in the frame image of interest.

Additionally, in this step, a flag value=1 representing a selection region is stored in the ith element in an array sel_flag_list[ ] that registers a flag value representing whether each region detected from the frame image of interest is a selection region or a nonselection region. That is, sel_flag_list[i]=1. Also, in this step, the value of the variable sel_num is incremented by one.

On the other hand, in step S207, a flag value=0 representing a nonselection region is stored in the ith element (sel_flag_list[i]) in sel_flag_list[ ].

The processes of steps S205 to S209 are thus performed for i=0 to (M−1), thereby selecting, as the selection region, a region whose continuous selection count is larger than 0 and smaller than the predetermined count Tcon out of the regions detected from the frame image of interest. Note that the number of regions each selected as a selection region (first selection region) is sel_num at this point.

Next, the processes of steps S210 to S218 are performed for j=sel_num to (Tsel−1). Tsel is a predetermined value preset to represent the maximum number of selection regions to be selected from one frame image. In this embodiment, the description will be made assuming that Tsel=22. However, the value is not limited to this. For example, Tsel may be set to ensure a predetermined ratio to the number of regions detected from the current frame.

First, in step S211, a variable max_t is initialized to 0. Next, the processes of steps S212 to S215 are performed for k=0 to (M−1). In step S213, it is determined whether a condition sel_flag_list[k]=0 and max_t<t[ID[k]] is satisfied. That is, it is determined in this step whether the condition that "the region of ID=ID[k]" detected from the frame image of interest is a nonselection region, and the continuous nonselection count of the nonselection region is larger than max_t is satisfied.

Upon determining that the condition is satisfied, the process advances to step S214. Upon determining that the condition is not satisfied, the process advances to step S215. In step S214, t[ID[k]] is set to the variable max_t, and the value of the variable k is set to the variable max_idx.

Steps S212 to S215 are thus performed for k=0 to (M−1), thereby specifying a nonselection region having the largest continuous nonselection count out of all nonselection regions in the frame image of interest. The index of the element in the array ID[ ], which stores the ID of the specified nonselection region, is set to the variable max_idx.

In step S216, the value of ID[max_idx] is set to the element (sel_list[sel_num]) represented by sel_num in sel_list[ ]. That is, the nonselection region having the largest continuous nonselection count is selected as a selection region (second selection region) out of all the nonselection regions in the frame image of interest. Additionally, in this step, a flag value=1 representing a selection region is stored in the element (sel_flag_list[max_idx]) represented by max_idx in the array sel_flag_list[ ]. Also, in this step, the value of the variable sel_num is incremented by one.

In step S217, it is determined whether the value of sel_num has reached M. Upon determining that the value has reached M, the process advances to step S219. On the other hand, upon determining that the value has not reached M, the process advances to step S218 to increment the value of the variable j by one. The process from step S211 is repeated.

The processes of steps S219 to S223 are performed for l=0 to (M−1). In step S220, it is determined whether sel_flag_list[l]=1. Upon determining that sel_flag_list[l]=1, the process advances to step S222. Upon determining that sel_flag_list[l]=0, the process advances to step S221.

In step S222, the value of f[ID[l]] is incremented by one, and the value of t[ID[l]] is initialized to 0. On the other hand, in step S221, the value of t[ID[l]] is incremented by one, and the value of f[ID[l]] is initialized to 0.

In this way, for each ID (each identification information), the number of continuous frames in which the region assigned the ID has been selected is managed as the continuous selection count, and the number of continuous frames in which the region has not been selected is managed as the continuous nonselection count using t[ ] and f[ ].

When a region serving as the first selection region is selected, the continuous selection count managed for the ID of that region is incremented by one, and the continuous nonselection count managed for the ID of that region is initialized to 0.

When a region serving as the second selection region is selected, the continuous selection count managed for the ID of that region is incremented by one, and the continuous nonselection count managed for the ID of that region is initialized to 0.

When a region corresponding to neither the first selection region nor the second selection region is set as a nonselection region, the continuous nonselection count managed for the ID of that nonselection region is incremented by one, and the continuous selection count managed for the ID of that nonselection region is initialized to 0.

In addition, the continuous nonselection count managed for the ID of a region whose continuous selection count has reached the predetermined count Tcon is incremented by one, and the continuous selection count managed for the ID of that region is initialized to 0.

At the point the process has transited to step S224, the IDs of the regions selected as the selection regions are registered in the array sel_list[0] to sel_list[Tsel−1]. Hence, in step S224, the regions assigned the IDs registered in the array sel_list[0] to sel_list[Tsel−1] are selected as the selection regions, and the control unit 104 is notified of the selected selection regions. This allows the control unit 104 to set a quantization step smaller than in other regions for each selection region in the frame image of interest.

In step S225, the value of the variable M is set to a variable Mprev, and the array ID[ ] is copied to the array IDprev[ ]. The variable Mprev represents the number of elements in the array IDprev[ ] and is used as the upper limit value when searching the array IDprev[ ] in step S203.

Out of the regions extracted from the frame image, a region assigned the same ID as that of a region that has not been selected in the past frame immediately before the frame of interest is defined as a nonselection region. In this case, with the above-described process, nonselection regions in number equal to or smaller than a predetermined number out of the nonselection regions are selected as some or all of the predetermined number of regions.

Figure 4:
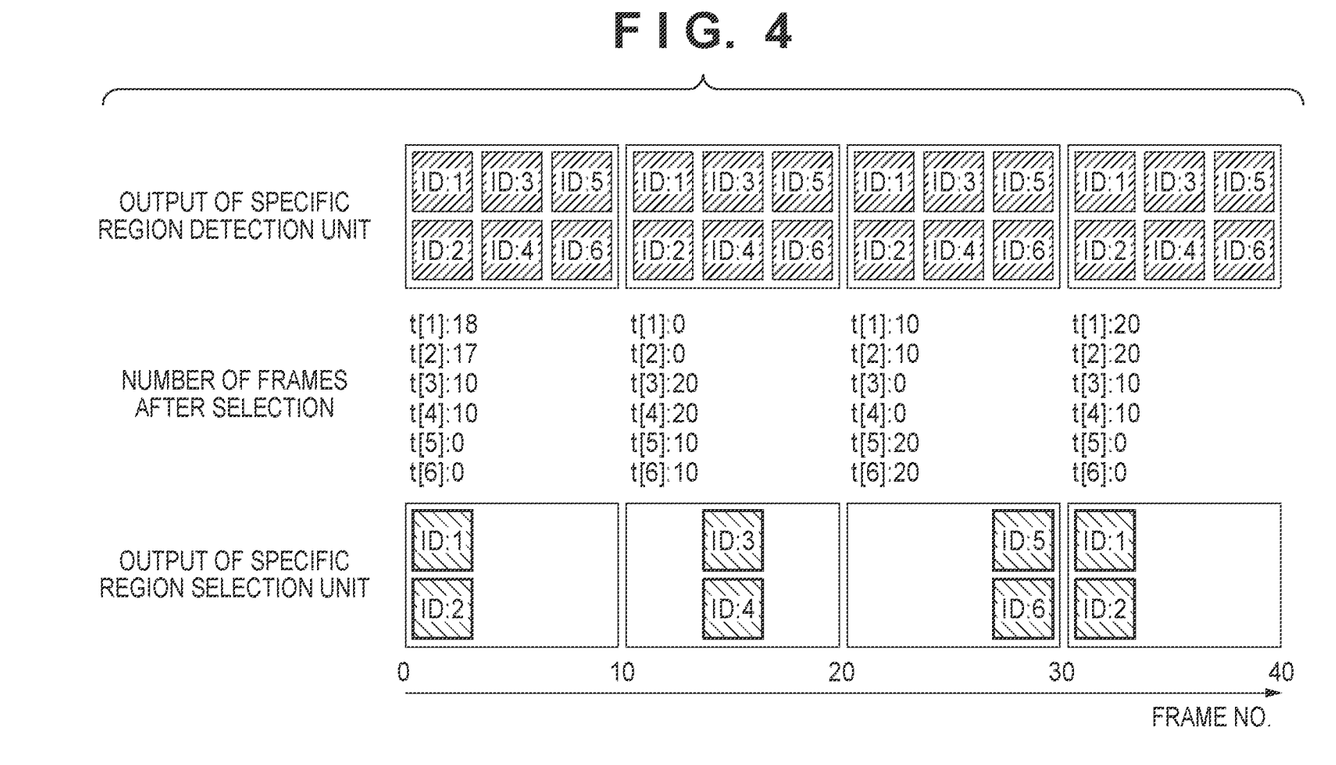
FIG. 4 is a view showing a detailed example of the process of the flowcharts shown in FIGS. 2A and 2B.

The process described with reference to the flowcharts of FIGS. 2A and 2B will be explained using a detailed example with reference to FIG. 4. FIG. 4 illustrates regions detected by the specific region detection unit 101, the values of t[ ] of the regions, and selection regions selected by the specific region selection unit 102 for each of the first to 40th frames. In FIG. 4, the specific region detection unit 101 detects six regions from each frame, IDs=1 to 6 are assigned to the regions, and all of sel_flag_list[1] to sel_flag_list[6] in the first frame are 0 for the descriptive convenience. Additionally, in FIG. 4, Tcon=10, and Tsel=2.

In the first frame, the top two regions in descending order of values of t[1] to t[6] are the region of ID=1 and the region of ID=2. Hence, the specific region selection unit 102 selects the region of ID=1 and the region of ID=2 as the selection regions. The specific region selection unit 102 initializes t[1] and t[2] to 0.

Until reaching the 10th frame, t[1] and t[2] remain 0, and t[3] to t[6] are incremented for each frame.

At the point the 10th frame has been reached, the top two regions in descending order of values of t[1] to t[6] are the region of ID=3 and the region of ID=4. Hence, the specific region selection unit 102 selects the region of ID=3 and the region of ID=4 as the selection regions. The specific region selection unit 102 initializes t[3] and t[4] to 0. Until reaching the 20th frame, t[3] and t[4] remain 0, and t[1], t[2], t[5], and t[6] are incremented for each frame.

At the point the 20th frame has been reached, the top two regions in descending order of values of t[1] to t[6] are the region of ID=5 and the region of ID=6. Hence, the specific region selection unit 102 selects the region of ID=5 and the region of ID=6 as the selection regions. The specific region selection unit 102 initializes t[5] and t[6] to 0.

Until reaching the 30th frame, t[5] and t[6] remain 0, and t[1] to t[4] are incremented for each frame.

At the point the 30th frame has been reached, the top two regions in descending order of values of t[1] to t[6] are the region of ID=1 and the region of ID=2. Hence, the specific region selection unit 102 selects the region of ID=1 and the region of ID=2 as the selection regions. The specific region selection unit 102 initializes t[1] and t[2] to 0.

When the object regions occupy most part of the frame, as shown in FIG. 4, and all the regions are directly encoded to higher image quality, the bit rate self-evidently largely exceeds the target bit rate. In this embodiment, however, since the specific region selection unit 102 selects the object regions, the actual bit rate never largely exceeds the target bit rate. Performing encoding while switching the selection regions enables to encode all specific regions to higher image quality at least once within a predetermined time.

Figure 5:
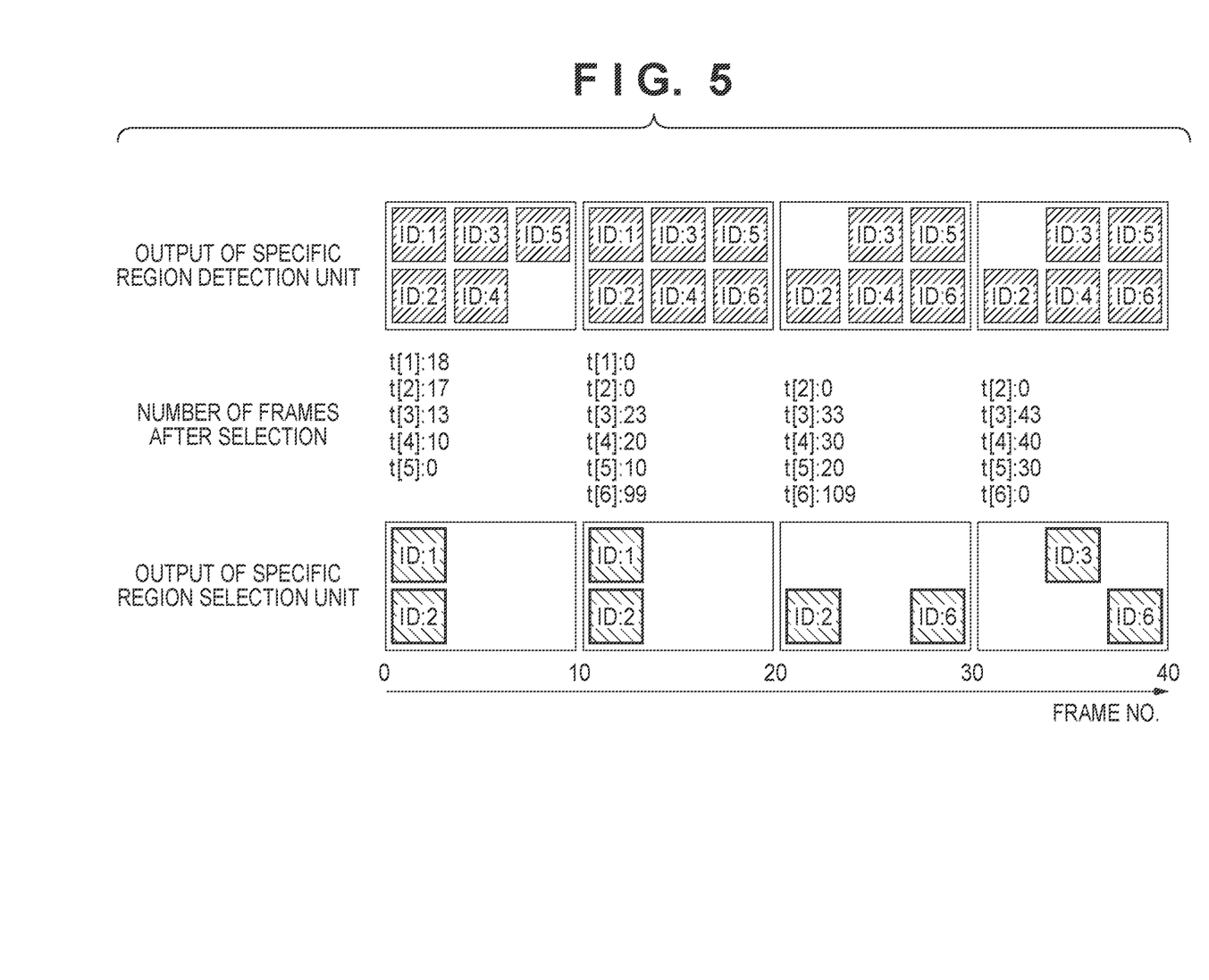
FIG. 5 is a view showing another detailed example of the process of the flowcharts shown in FIGS. 2A and 2B.

The operation of the specific region selection unit 102 when frame-in and frame-out of an object region occur will be described next with reference to FIG. 5. FIG. 5 illustrates regions detected by the specific region detection unit 101, the values of t[ ] of the regions, and selection regions selected by the specific region selection unit 102 for each of the first to 40th frames. In FIG. 5, all of sel_flag_list[1] to sel_flag_list[6] in the first frame are 0. Additionally, in FIG. 5, Tcon=30, and Tsel=2.

In the first to ninth frames, the specific region detection unit 101 detects five regions of IDs=1 to 5. The top two regions in descending order of values of t[1] to t[5] of the regions are the region of ID=1 and the region of ID=2. Hence, the specific region selection unit 102 selects the region of ID=1 and the region of ID=2 as the selection regions. The specific region selection unit 102 initializes t[1] and t[2] to 0. After that, t[1] and t[2] remain 0, and t[3] to t[5] are incremented for each frame.

When the 10th frame has been reached, the region of ID=6 is newly detected. Hence, a sufficiently large predetermined value "99" is set for t[6] of the region. At this point, the top two regions in descending order of values of t[1] to t[6] are the region of ID=3 and the region of ID=6. However, the continuous selection counts of f[1] and f[2] are still smaller than Tcon, and the number of selection regions currently selected is 2 (=Tsel) at this point. For this reason, no selection region is added. The specific region selection unit 102 continuously selects, as the selection regions, the region of ID=1 and the region of ID=2 which are currently selected as the selection regions. The specific region selection unit 102 initializes t[1] and t[2] to 0. After that, t[1] and t[2] remain 0, and t[3] to t[6] are incremented for each frame.

When the 20th frame has been reached, the region of ID=1 exits the frame and is not detected anymore. As a result, the number of selection regions changes to 1 at this point. For this reason, the region of ID=6, which is the top region in descending order of values of t[3] to t[6] at this point, is additionally selected as a new selection region. The specific region selection unit 102 initializes t[2] and t[6] to 0. After that, t[2] and t[6] remain 0, and t[3] to t[5] are incremented for each frame.

When the 30th frame has been reached, the continuous selection count of the region of ID=2 reaches 30. It is therefore necessary to select a selection region alternative to this region. On the other hand, the continuous selection count of the region of ID=6 does not reach 30 yet. Hence, no selection region alternative to this region need be selected. The top region in descending order of values of t[3] to t[5] at this point is the region of ID=3. Hence, the specific region selection unit 102 selects the region of ID=3 and the region of ID=6 as the selection regions. The specific region selection unit 102 initializes t[3] and t[6] to 0.

Figure 2A:
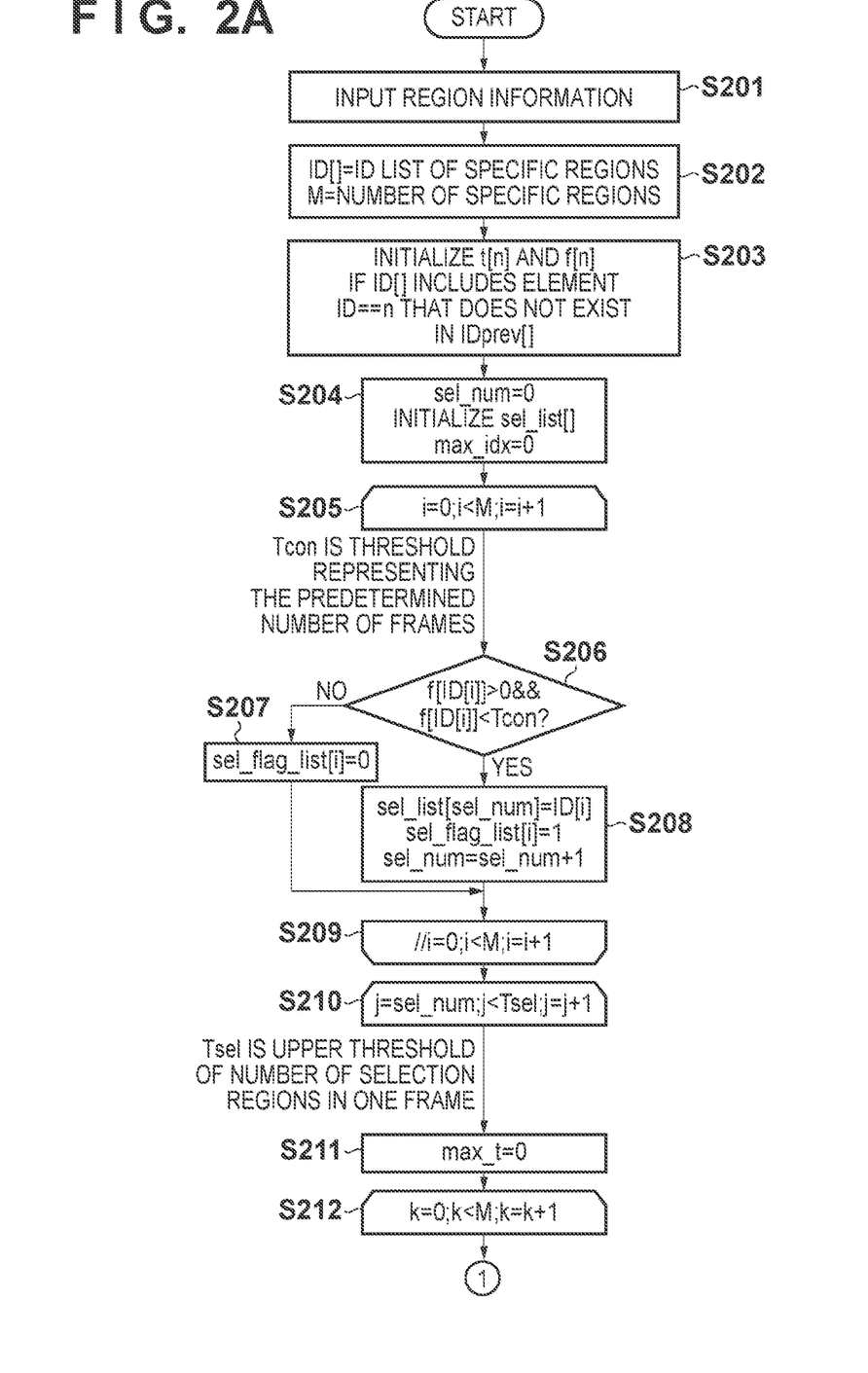
FIGS. 2A and 2B are flowcharts of a selection region selecting process to be performed by a specific region selection unit 102.
Figure 2B:
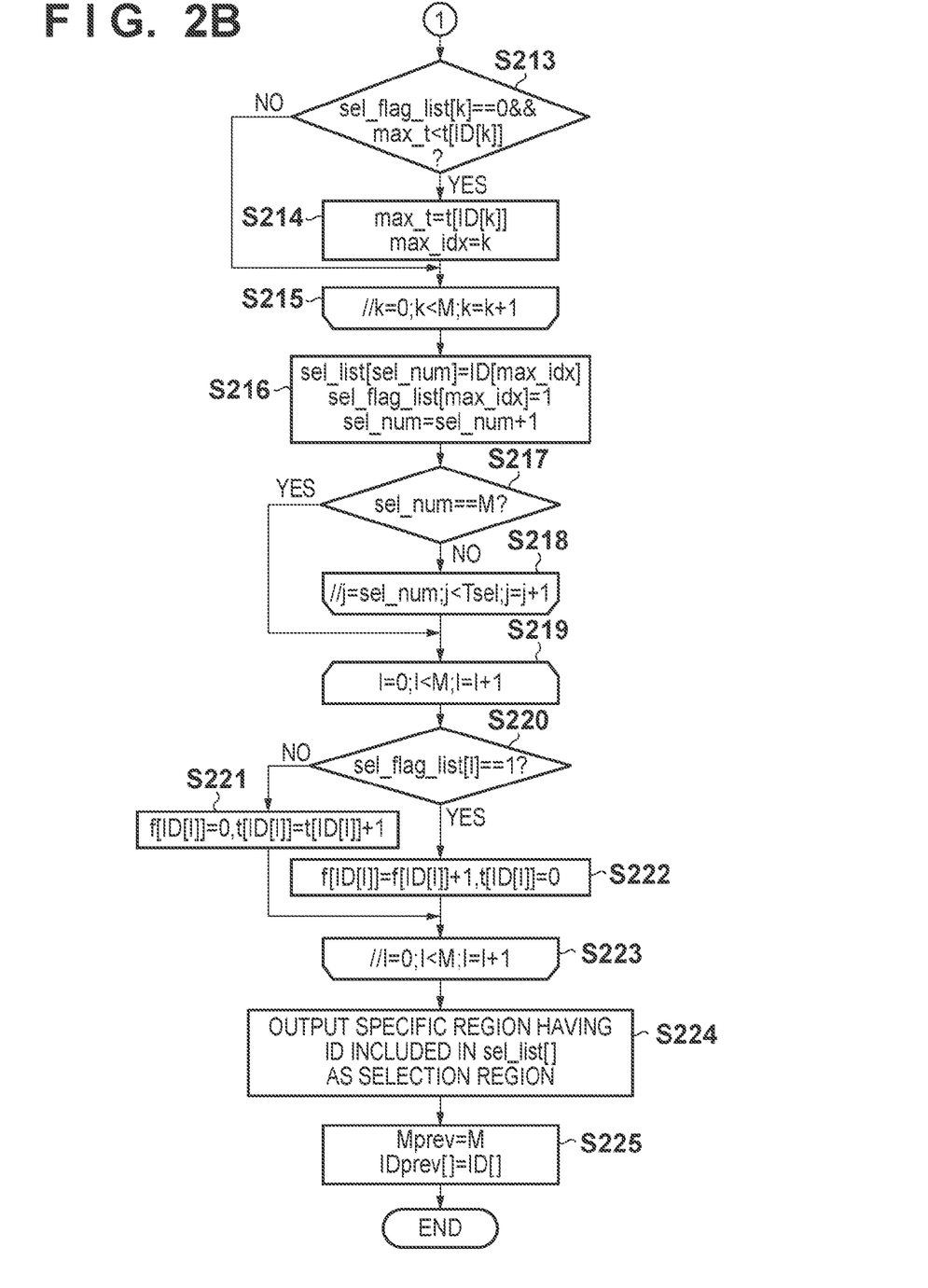

In the flowcharts of FIGS. 2A and 2B, the selection regions are selected in descending order of continuous nonselection count. However, the criterion of selection is not limited to this. For example, the selection regions may be selected based on the coordinates of the regions. More specifically, the center of gravity is calculated for each nonselection region based on its coordinates. The top (Tsel−sel_num−1) (N) nonselection regions may be selected as the selection regions in ascending order of distance between the center of gravity and an edge of the frame. The probability of occurrence of frame-in and frame-out is high for a region located at a frame edge. Preferentially selecting this region provides an effect of preventing the region from exiting the frame without being encoded to higher image quality. Alternatively, a frame may be divided into a plurality of regions. One of the plurality of divided regions may be decided as a selected divided region, and only a region having the center of gravity within it may be selected as the selection region. When the selection region is decided in this way, all regions in the frame can be encoded to a higher image quality by sequentially switching the selected divided region.

A region having a high moving speed is supposed to exit a frame at a high probability. For this reason, the moving speed of each nonselection region may be calculated based on the change amounts of the coordinates of its center of gravity between frames, and the top (Tsel−sel_num−1) nonselection regions may be selected as the selection regions in descending order of moving speed.

The top (Tsel−sel_num−1) nonselection regions may be selected as the selection regions in ascending order of accumulated value of continuous selection counts. A region having a small continuous selection count means that the time the region has been encoded to higher image quality is short. For example, in a use case of personal identification using a surveillance camera, if the time a region has been encoded to higher image quality is short, the possibility of personal identification lowers. Preferentially selecting a region for which the accumulated value of continuous selection counts is small allows an increase in the possibility that the captured person is identified.

A condition to prohibit selecting a region as a selection region may be set. For example, a selecting method of excluding a region continuously detected in a predetermined number of frames or more or a region selected in a predetermined number of frames or more from the selection target may be executed. Since these regions are already encoded to higher image quality at a high possibility, excluding them from the selection target in advance provides an effect of increasing the possibility of identification of a captured person. In addition, a region that satisfies a specific condition may always be selected as a selection region. A process of, for example, always selecting, as a selection region, a region that has been selected in a minimum number of frames may be performed. These selecting methods need not always be used solely and may be combined to decide a selection region.

Second Embodiment

In this embodiment, an encoding process which is different from that of the first embodiment and is to be performed by an image processing apparatus having the arrangement shown in FIG. 1 will be described. Only the difference from the first embodiment will be described below, and portions other than the points to be explained below are the same as in the first embodiment.

Figure 3A:
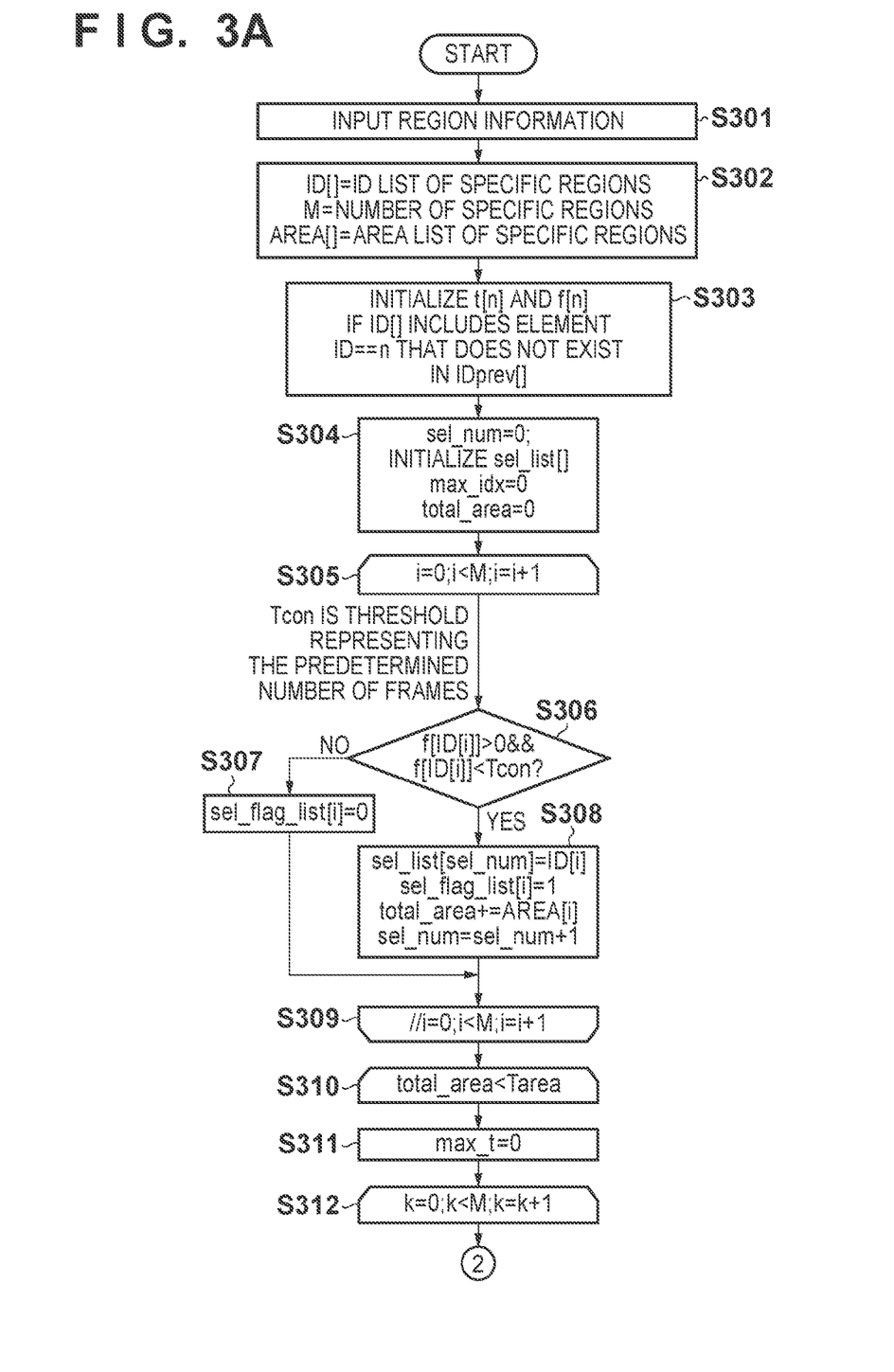
FIGS. 3A and 3B are flowcharts of a selection region selecting process to be performed by a specific region selection unit 102.
Figure 3B:
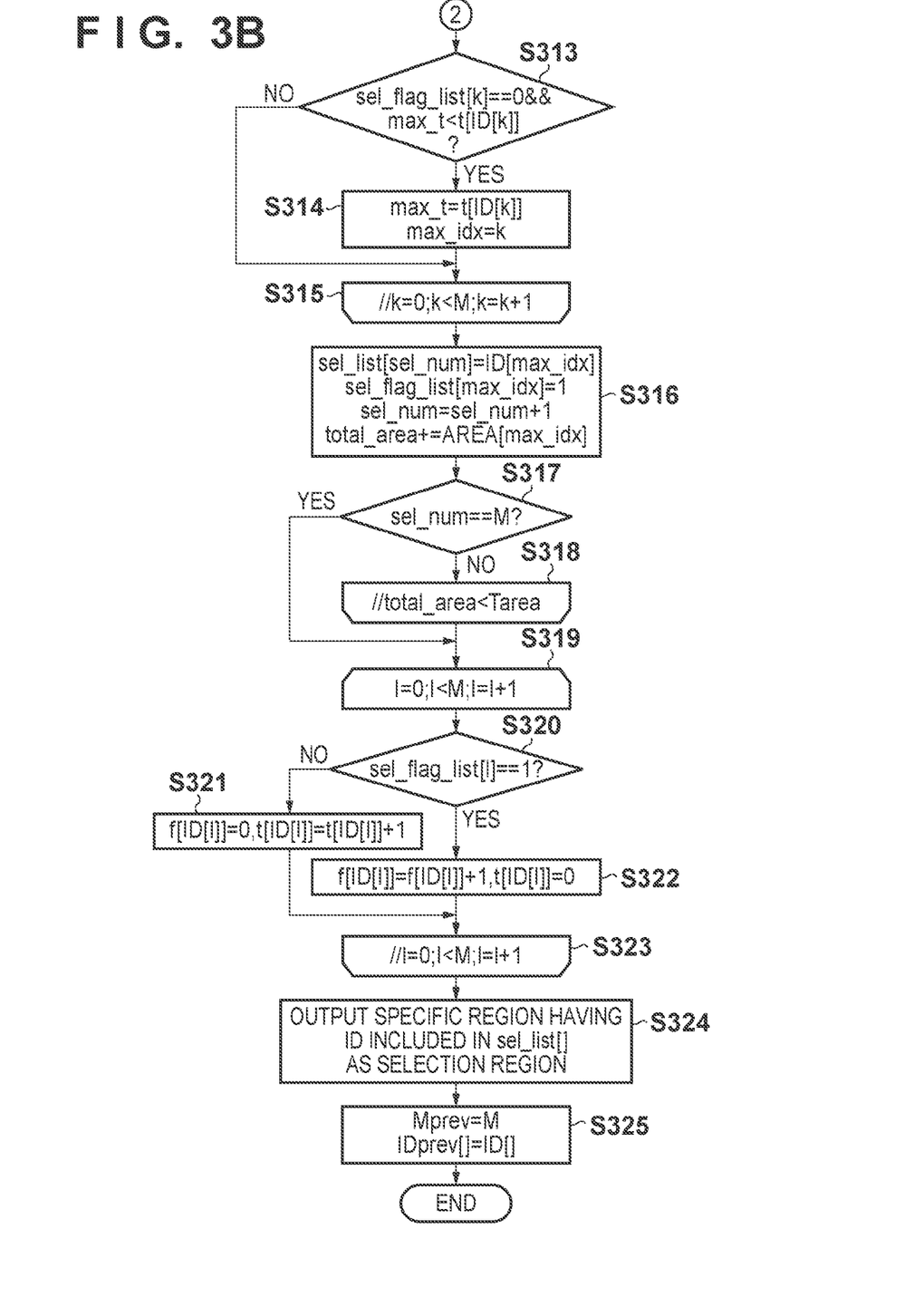

A process to be performed by a specific region selection unit 102 according to this embodiment will be described with reference to FIGS. 3A and 3B each of that illustrates the flowchart of the process. Each of FIGS. 3A and 3B shows an example of a process of causing the specific region selection unit 102 to decide selection regions such that the total area of the selected regions becomes constant between the frames. That the area of the selection regions is constant means that the area of regions to be encoded to a higher image quality is constant. This has an effect of suppressing a variation in the bit rate between frames. The process according to the flowcharts of FIGS. 3A and 3B is performed for each frame, like the process according to the flowcharts of FIGS. 2A and 2B. Succeeded information is the same as in the first embodiment.

The "area of a region" indicates the number of pixel blocks obtained in the region upon dividing the image into a plurality of pixel blocks for encoding. However, the definition of the area is not limited to this. For example, the number of pixels included in a region may be defined as the area of the region.

Note that steps S301 to S309 are the same as steps S201 to S209 of FIG. 2A except steps S302, S304, and S308, and a description thereof will be omitted.

In step S302, the area of each region is acquired from the feature information of the region and stored in an array AREA[ ], in addition to the process of step S202. That is, the areas of regions of IDs=ID[0] to ID[M−1] are stored in AREA[0] to AREA[M−1], respectively.

In step S304, a variable total_area is initialized to 0, in addition to the process of step S204.

In step S308, the value of the variable total_area is incremented by the value of AREA[i], in addition to the process of step S208. At the point the process has transited to step S310, the total area of regions for which the continuous selection count is larger than 0 and smaller than a predetermined count Tcon out of the regions detected from the frame image of interest is stored in the variable total_area.

The processes of steps S310 to S318 are repetitively performed until the value of the variable total_area exceeds a predetermined value Tarea. For example, at the point the value of the variable total_area has exceeded Tarea, the finally selected region may be canceled to prevent the total area of the selection regions from exceeding Tarea. Tarea can be a fixed value, a variable value corresponding to a predetermined ratio to the total area of all detected regions, or a value to be decided based on the frame size.

Steps S311 to S315 are the same as steps S211 to S215 of FIGS. 2A and 2B, and a description thereof will be omitted.

In step S316, the value of the variable total_area is incremented by the value of AREA[max_idx], in addition to the process of step S216. That is, when a region that is a nonselection region is selected as a selection region, the area of the selection region is added to the value of the variable total_area.

In step S317, it is determined whether the value of sel_num has reached M. Upon determining that the value has reached M, the process advances to step S319. Upon determining that the value has not reached M, the process advances to step S318 to repeat the process from step S311 as long as total_area<Tarea is satisfied. The subsequent process is the same as in the first embodiment.

Figure 6:
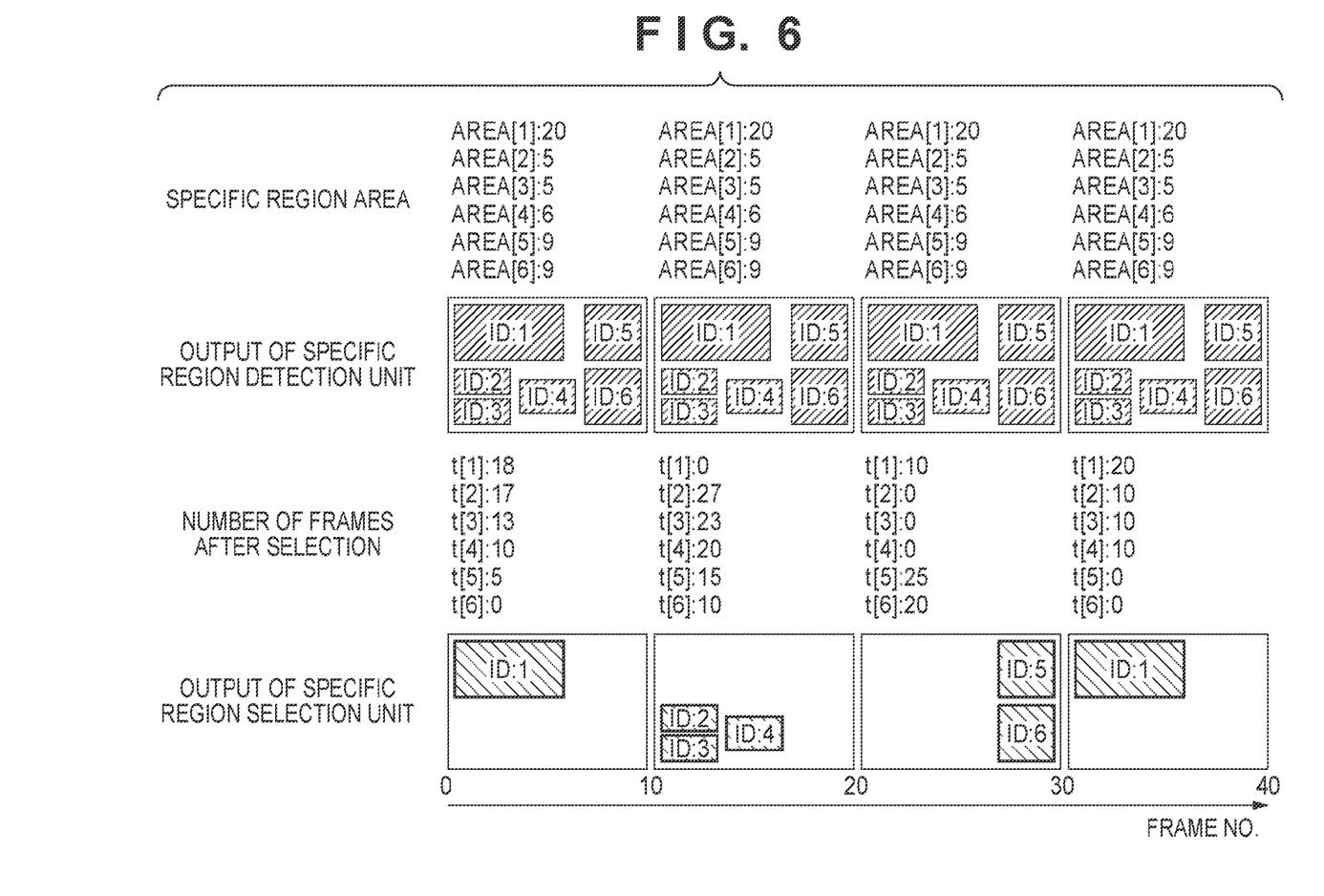
FIG. 6 is a view showing a detailed example of the process of the flowcharts shown in FIGS. 3A and 3B.

The process described with reference to the flowcharts of FIGS. 3A and 3B will be explained using a detailed example with reference to FIG. 6. FIG. 6 illustrates regions detected by a specific region detection unit 101, the values of t[ ] and AREA[ ] of the regions, and selection regions selected by the specific region selection unit 102 for each of the first to 40th frames. In FIG. 6, the specific region detection unit 101 detects six regions from each frame, IDs=1 to 6 are assigned to the regions, and all of sel_flag_list[1] to sel_flag_list[6] in the first frame are 0 for the descriptive convenience. Additionally, in FIG. 6, Tcon=10, and Tarea=15.

In the first frame, since t[1] out of t[1] to t[6] has the largest value, the region of ID=1 is selected first as the selection region. The area of the region of ID=1 is AREA[1]=20 which is larger than Tarea at the point the region has been selected. For this reason, region selection is not performed anymore. The specific region selection unit 102 initializes t[1] to 0. After that, t[1] remains 0, and t[2] to t[6] are incremented for each frame.

At the point the 10th frame has been reached, t[2]>t[3]>t[4]>t[5]>t[6]. Hence, the regions are selected in the order of IDs=2, 3, 4, 5, and 6. At the point the regions of IDs=2, 3, and 4 have been selected, the total area of the selected regions is 16 which is larger than Tarea. Hence, the specific region selection unit 102 initializes t[2], t[3], and t[4] to 0. After that, t[2], t[3], and t[4] remain 0, and t[1], t[5], and t[6] are incremented for each frame.

At the point the 20th frame has been reached, t[5]>t[6]>t[1]. Hence, the regions are selected in the order of IDs=5, 6, and 1. At the point the regions of IDs=5 and 6 have been selected, the total area of the selected regions is 18 which is larger than Tarea. Hence, the specific region selection unit 102 initializes t[5] and t[6] to 0. After that, t[5] and t[6] remain 0, and t[1] to t[4] are incremented for each frame.

At the point the 30th frame has been reached, t[1]>t[2]≥t[3]≥t[4]. Hence, the regions are selected in the order of IDs=1, 2, 3, and 4 (since the regions of IDs=2, 3, and 4 have the same area, the selection order is not particularly limited). At the point the region of ID=1 has been selected, the total area of the selected region is 20 which is larger than Tarea. Hence, the specific region selection unit 102 initializes t[1] to 0. After that, t[1] remains 0, and t[2] to t[6] are incremented for each frame.

When the object regions occupy most part of the frame, as shown in FIG. 6, and all the regions are directly encoded to higher image quality, the bit rate of the frame is very high. In this embodiment, however, since the specific region selection unit 102 selects the object regions, the bit rate of the entire frame does not so largely increase. Performing encoding while switching the selection regions enables to encode all regions to higher image quality at least once within a predetermined time. In addition, selecting regions such that the area of the selection regions becomes constant between the frames allows to suppress the variation in the bit rate between the frames.

Note that in the flowcharts of FIGS. 3A and 3B, the selection regions are selected in descending order of continuous nonselection count. However, the criterion of selection is not limited to this. For example, the selection regions may be selected from the top in ascending order of area. A face captured in a small size is more difficult to identify the person than a face captured in a large size. For this reason, preferentially selecting a region having a small area provides an effect of increasing the possibility the captured person is identified.

Third Embodiment

The units shown in FIG. 1 can be implemented by hardware. However, they may be implemented by software (computer program). In this case, a computer including a storage device (for example, hard disk) for holding the software can function as the image processing apparatus according to the first or second embodiment. That is, the CPU of the computer reads out the software and executes the processing so that the computer implements the functions of the units shown in FIG. 1. The computer can be formed from either one apparatus or two or more apparatuses, as a matter of course.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-129544 filed Jun. 9, 2011 which is hereby incorporated by reference herein in its entirety.

What is claimed is:

1. An image processing apparatus for encoding two or more frame images of a moving image, comprising:
    an extraction unit that extracts one or more specific regions corresponding to an object from a frame image;
    an encoding unit that encodes a target frame image using an encoding parameter so that image quality of one or more selected regions among specific regions is higher than that of one or more regions other than the selected regions,
    wherein said encoding unit encodes the target frame so that image quality of a first region extracted by said extraction unit from a first frame is higher than image quality of a second region different from the first region in the first frame, and
    wherein, when said extraction unit extracts from a second frame subsequent to the first frame a third region corresponding to the first region and a fourth region not corresponding to a region whose image quality is higher than that of the second region in the first frame, said encoding unit selects the fourth region as a region whose image quality is to be higher in the second frame in preference to the third region.

2. The apparatus according to claim 1, wherein said encoding unit selects, out of regions extracted from the second frame not corresponding to regions each of which has image quality being higher than that of the second region in the first frame, regions in a predetermined number according to distance from an edge of the second frame as a region whose image quality is to be higher in the second frame.

3. The apparatus according to claim 1, wherein said encoding unit selects, out of regions extracted from the second frame not corresponding to regions each of which has image quality being higher than that of the second region in the first frame, regions in a predetermined number according to moving speed between frames as a region whose image quality is to be higher in the second frame.

4. The apparatus according to claim 1, wherein said encoding unit selects, out of nonselection regions which are unselected from the first frame as a region whose image quality is to be higher, the nonselection regions in a predetermined number from a top in ascending order of accumulated value of continuous selection counts as a region whose image quality is to be higher in the second frame.

5. The apparatus according to claim 1, wherein the encoding unit encodes each frame image using the encoding parameter that sets a quantization step to be used to encode a region selected from the image as a region whose image quality is to be higher to be smaller than a quantization step to be used to encode regions other than the selected region.

6. An image processing method to be performed by an image processing apparatus for encoding two or more frame images of a moving image, comprising:
    an extraction step of extracting one or more specific regions corresponding to an object from a frame image;
    an encoding step of encoding a target frame image using an encoding parameter so that image quality of one or more selected regions among the specific regions is higher than that of one or more regions other than the selected regions,
    wherein said encoding step encodes the target frame image so that image quality of a first region extracted by said extraction step from a first frame is higher than image quality of a second region different from the first region in the first frame, and
    wherein, when said extraction step extracts from a second frame subsequent to the first frame a third region corresponding to the first region and a fourth region not corresponding to a region whose image quality is higher than that of the second region in the first frame, said encoding step selects the fourth region as a region whose image quality is to be higher in the second frame in preference to the third region.

7. A non-transitory computer-readable storage medium storing a computer program that causes a computer to function as each unit of the image processing apparatus of claim 1.

8. The apparatus according to claims 1, further comprising a setting unit that assigns, to regions included in the frame image, selection information indicating whether or not said encoding unit selects as a region whose image quality is to be higher.

9. The apparatus according to claim 8, further comprising a first acquisition unit that acquires, on the basis of the selection information assigned to one or more regions included in the frame image, a continuous nonselection count indicating the number of continuous frames in which a region is not selected for one or more regions in the frame image,
    wherein for each frame, said encoding unit selects, on the basis of the continuous nonselection count acquired by said first acquisition unit for selection information of the specific region extracted from the frame image by said extraction unit, regions in a predetermined number from a top in descending order of continuous nonselection count as selection regions.

10. The apparatus according to claim 9, further comprising a second acquisition unit that acquires, on the basis of the selection information assigned to one or more regions included in the frame image, a continuous selection count indicating the number of continuous frames in which a region is selected for one or more regions in the frame image,
    said encoding unit selects, on the basis of the continuous selection count acquired by said second acquisition unit for selection information of the specific region extracted from the frame image by said extraction unit, the specific region for which the continuous selection count is larger than 0 and smaller than a predetermined count as a first selection region, and letting N be a remaining number obtained by subtracting the number of first selection regions from the predetermined number, said encoding unit selects, on the basis of the continuous nonselection count acquired by said first acquisition unit for selection information of the specific region extracted from the frame image by said extraction unit, N regions from the top in descending order of continuous nonselection count as second selection regions.

11. The apparatus according to claim 10, further comprising:

a first storage unit that stores the continuous nonselection count;

a second storage unit that stores the continuous selection count; and a management unit that manages the continuous nonselection count and the continuous selection count, and when said encoding unit selects a region as the first selection region, said management unit increments the continuous selection count of the selected first selection region by one and initializes the continuous nonselection count of the selected first selection region to 0, when said encoding unit selects a region as the second selection region, said management unit increments the continuous selection count of the selected second selection region by one and initializes the continuous nonselection count of the selected second selection region to 0, when a region corresponding to neither the first selection region nor the second selection region out of the specific regions extracted from the frame image by said extraction unit is set as a nonselection region, said management unit increments the continuous nonselection count of the nonselection region by one and initializes the continuous selection count of the nonselection region to 0, and the management unit increments the continuous nonselection count of a region whose continuous selection count has reached the predetermined count out of the specific regions extracted from the frame image by said extraction unit by one and initializes the continuous selection count of the region to 0.

12. The apparatus according to claim 1, wherein when a first region selected as the selection region from a frame image of a first frame is extracted as the specific region for all frames between the first frame to a second frame subsequent to the first frame, said encoding unit selects, as the selection region, a second region different from the first region among specific regions extracted from a frame image of the second frame.

13. The apparatus according to claim 1, wherein said extraction unit extracts the specific regions on the basis of features of plural regions included in the frame image.

14. The apparatus according to claim 1, wherein said extraction unit extracts the specific regions on the basis of objects included in the frame image.

15. The apparatus according to claim 1, wherein said extraction unit extracts the specific regions for each frame.

16. The apparatus according to claim 1, wherein said extraction unit extracts the specific regions on the basis of objects captured in the target frame image to assign identification information to each of the extracted specific regions, wherein said encoding unit selects the first region in the first frame corresponding to first identification information as a region whose image quality is to be higher, and selects the fourth region corresponding to second identification information different from the first identification information as a region whose image quality is to be higher.

* * * * *